(12) United States Patent
Saliba

(10) Patent No.: US 6,288,870 B1
(45) Date of Patent: *Sep. 11, 2001

(54) SELF-ALIGNED METAL FILM CORE MULTI-CHANNEL RECORDING HEAD FOR TAPE DRIVES

(75) Inventor: George A. Saliba, Northboro, MA (US)

(73) Assignee: Quantum Corporation, Milpitas, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/006,281

(22) Filed: Jan. 13, 1998

(51) Int. Cl.[7] ........................................ G11B 5/29
(52) U.S. Cl. ................................ 360/121; 360/125
(58) Field of Search .................... 360/119, 121, 360/125, 126

(56) References Cited

U.S. PATENT DOCUMENTS

| | | | |
|---|---|---|---|
| 3,593,414 | 7/1971 | Beun et al. | 29/603 |
| 3,634,933 | * 1/1972 | Hanak | 29/603.11 |
| 3,655,923 | * 4/1972 | Lang, Jr. | 360/125 |
| 3,722,081 | 3/1973 | Neace | 29/603 |
| 3,792,492 | * 2/1974 | Neace | 360/103 |
| 3,909,932 | * 10/1975 | Kroon | 29/603.21 |
| 3,925,884 | * 12/1975 | Case | 29/603.16 |
| 4,092,688 | * 5/1978 | Nomura et al. | 360/121 |
| 4,590,530 | 5/1986 | Sakakima et al. | 360/122 |
| 4,601,099 | 7/1986 | Nishiyama | 29/603 |
| 4,602,307 | 7/1986 | Toriu et al. | 360/125 |
| 4,772,967 | 9/1988 | Okuda et al. | 360/84 |
| 4,815,197 | 3/1989 | Ota et al. | 29/603 |
| 4,868,698 | 9/1989 | Takahashi et al. | 360/126 |
| 4,894,742 | 1/1990 | Saito et al. | 360/126 |
| 4,999,904 | * 3/1991 | Nanjyo et al. | 29/603.13 |
| 5,055,959 | 10/1991 | Saliba | 360/122 |
| 5,079,664 | 1/1992 | Miyaguchi | 360/126 |
| 5,084,129 | 1/1992 | Fukuda et al. | 156/634 |
| 5,184,393 | * 2/1993 | Saito et al. | 29/603.07 |
| 5,267,107 | 11/1993 | Vadnais et al. | 360/103 |
| 5,426,551 | 6/1995 | Saliba | 360/122 |
| 5,475,553 | 12/1995 | Saliba | 360/122 |
| 5,477,405 | * 12/1995 | Okada et al. | 360/121 |
| 5,481,425 | * 1/1996 | Sampei et al. | 360/126 |
| 5,610,786 | 3/1997 | Tokutaki et al. | 360/122 |
| 5,691,866 | * 11/1997 | Yamamoto | 360/126 |
| 5,729,413 | * 3/1998 | Gooch et al. | 360/125 |
| 5,844,745 | * 12/1998 | Ohmori et al. | 360/119 |
| 5,854,726 | * 12/1998 | Kubota et al. | 360/121 |
| 5,936,815 | * 8/1999 | Kumagai et al. | 360/126 |

FOREIGN PATENT DOCUMENTS

| | | |
|---|---|---|
| 2209781 | 9/1972 | (DE) . |
| 1112823 | 3/1956 | (FR) . |

OTHER PUBLICATIONS

"Ferrite Magnetic Head" *IBM Tech. Discl. Bull.* vol. 23, No. 7A, Dec. 1980, pp. 2972–2973.

"Multiple Track Recording Head", *IBM Tech. Discl. Bull.* vol. 8, No. 10, Mar. 1966 p. 1317.

* cited by examiner

Primary Examiner—Brian E. Miller
(74) Attorney, Agent, or Firm—Steven G. Roeder

(57) ABSTRACT

A self-aligned multi-channel tape head structure has a non-magnetic ceramic substrate defining an interior longitudinal channel and a plurality of head regions. At least one head leg at each region defines lateral openings to the interior longitudinal channel. Each head region has a thin-film metal magnetic core deposited on an inside wall surface of the ceramic substrate and a magnetic gap in a longitudinal face of the ceramic substrate. A coil of wire is wound around each head leg to provide a magnetic transducer head at each head region.

15 Claims, 4 Drawing Sheets

SELF-ALIGNED METAL FILM CORE MULTI-CHANNEL RECORDING HEAD FOR TAPE DRIVES

FIELD OF THE INVENTION

The present invention relates to magnetic recording heads. More particularly, the present invention relates to a self-aligned metal film core multi-channel recording head for tape drives.

BACKGROUND OF THE INVENTION

Ferromagnetic materials, such as ferrite ceramic materials, continue to experience widespread use in the formation of magnetic recording transducer heads, particularly those used for magnetic tape recordings. Designers and manufacturers of helical scan (4 mm and 8 mm), quarter inch cartridge (QIC) and half inch linear streaming tape drives continue to find ways to extend the life of ferrite recording head technology. One reason behind this drive to extend the life of ferrite recording head technology is the considerable capital investment, worldwide, in the manufacturing technology and processing equipment, as well as the cost effectiveness and reliability experienced when using wear-resistant ceramic materials with known abrasion and wear characteristics in tape contact recording.

Originally, most ferrite-based head transducers used in disk (fixed and floppy) and tape drives employed discrete heads formed of polycrystalline ferrite. Subsequently, single crystal and metal-in-gap (MIG) technologies were introduced and refined. For example, today's DLT™ streaming tape drives employ advanced ferrite head transducers which have improved an order of magnitude over the 12 year life of the DLT™ product line. The current ferrite heads employ a single crystal material which reduces noise and increases frequency response over polycrystal ferrite head designs. MIG technologies have also improved data writing.

Even more recently, multi-channel head arrays have been formed out of undivided bars of ferrite which have been precisely machined to provide precise head-to-head alignment of the type needed for record/playback compatibility on different tape drives of the same or compatible design. The present inventor has developed self-aligned multiple channel head assembly for tape drives. Plural ferrite head regions were precisely machined from a single elongated ferrite bar in a manner realizing self-alignment and efficient use of materials with low manufacturing costs. Examples of this prior development are set forth in commonly assigned, copending U.S. patent application Ser. No. 08/899,082 filed Jul. 23, 1997, entitled: "Method and Apparatus for Multiple Channel Head Assembly" (File Wrapper Continuation of earlier application Ser. No. 08/507,618 filed on Jul. 26, 1995, now abandoned). The disclosure of this application is incorporated herein by reference.

It is known to employ soft magnetic metal alloy materials formed of iron and aluminum as core structures for tape heads. Alfenol (84 percent Fe, 16 percent Al), Sendust(85 percent Fe, 6 percent Al, 9 percent Si, also referred to as Spinalloy), and Vacodur (similar to Alfenol but more workable) are examples of very hard and brittle soft magnetic materials which have been formed and used as head cores. U.S. Pat. No. 4,894,742 to Saito et al. entitled: "Thin-Film Laminated Magnetic Heads of Fe—Si—Al Alloy"; and, U.S. Pat. No. 5,610,786 to Tokutake et al. entitled: "Magnetic Head Having CAO-TIO2-NIO Ceramic With Specified CAO/TIO2 Ratio", and U.S. Pat. No. 4,772,967 to Okuda et al. for "Magnetic Recording Apparatus in a Helical Scan System" set forth examples of single channel heads including alloy films. The disclosures of these patents are incorporated herein by reference.

A common method of fabricating metal thin film heads comprises the steps of sputtering a metallic magnetic thin film on a non-magnetic substrate such as glass or non-magnetic ceramic, followed by successive lamination of alternating layers of magnetic film and non-magnetic insulation to form a laminar head core structure manifesting minimized eddy current. A second substrate, such as glass or non-magnetic ceramic, is then bonded to the laminar core structure to form a sandwich construction. The head structure is completed by winding a coil of wire around a segment of the magnetic core. The number of magnetic films and layers is determined to handle the desired flux density at the head gap with minimized unwanted eddy currents in the core structure. One drawback of this approach shown in the referenced patents is that it is difficult to align the resultant discretely formed heads within a multi-head structure with sufficient precision required for high track density and repeatability from tape drive to tape drive.

A hitherto unsolved need has remained for a precisely-aligned multi-channel tape head with vastly improved high frequency performance while employing existing head array manufacturing technology and consequent cost efficiencies.

SUMMARY OF THE INVENTION WITH OBJECTS

A general object of the present invention is to provide a multi-channel tape head structure providing a self-aligned array of magnetic transducing heads each having a thin-film magnetic metal core formed on an inside wall portion thereof in a manner overcoming limitations and drawbacks of the prior art approaches.

Another object of the present invention is to form a thin-film magnetic core on an inside wall of a head region of an elongated head bar structure in a manner realizing improved high frequency performance for a resulting magnetic transducing head of the head bar structure.

A further object of the present invention is to employ known thin-film magnetic metal alloys and deposition techniques to provide a deposited magnetic core onto inside walls of a ceramic substrate forming a magnetic head array in a manner overcoming limitations and drawbacks of the prior art.

In accordance with one aspect of the present invention, a self-aligned multi-channel tape head structure comprises a non-magnetic ceramic substrate having an interior longitudinal channel and defining a plurality of head regions. Each head region has at least one head leg defining openings to the interior longitudinal channel. Each head region includes a thin-film metal magnetic core deposited on an inside wall surface of the ceramic substrate and having a magnetic gap in a face of the ceramic substrate. Each head region has a coil of wire wound around the head leg.

In accordance with another aspect of the present invention a multi-channel tape head structure incorporates a plurality of precisely aligned magnetic transducing heads, each comprising a flat, generally box-shaped non-magnetic ceramic substrate having a central opening and an apex defining a transverse gap from an exterior wall surface to the central opening. A magnetic metal thin-film core is formed e.g. by sputter deposition on an inside wall surface of the ceramic substrate and has magnetic pole portions extending into the transverse gap. A thin-film insulator material is located between the magnetic pole portions; and, a coil of wire is wound around a leg portion of the ceramic substrate including a portion of the magnetic metal thin-film core.

In accordance with a further aspect of the present invention a method is provided for forming a self-aligned metal film core multi-channel head assembly for tape drives. The new method comprises the steps of:

forming a C-bar and forming an I-bar of suitable substantially non-magnetic ceramic material to have a predetermined longitudinal (cross-sectional) geometry (wherein the C-bar and the I-bar may have symmetric or non-symmetric cross-sectional geometries);

sequentially depositing thin-film magnetic metal and insulating layer onto the inner surfaces of the C-bar and I-bar at the predetermined multiple head regions to form a plurality of spaced-apart core segments;

bonding the C-bar and the I-bar together in confronting alignment with a non-magnetic bonding medium to form an intermediate assembly such that a thin film laminar magnetic core formed by aligned core segments and having a thin insulating layer defining a magnetic gap is formed at a location of each one of the multiple head regions of the assembly;

machining the bonded intermediate assembly to expose core legs at each said head region, each leg having a portion of said thin film laminar magnetic core formed on an inside wall of the leg; and, winding a coil of wire around at least one of the core legs of each head region to form completed heads of the multi-channel head assembly.

These and other objects, aspects, advantages and features of the invention will be more fully understood and appreciated upon considering the following detailed description of a preferred embodiment presented in conjunction with the accompanying drawings.

DETAILED DESCRIPTION OF A PREFERRED EMBODIMENT

Figure 1:
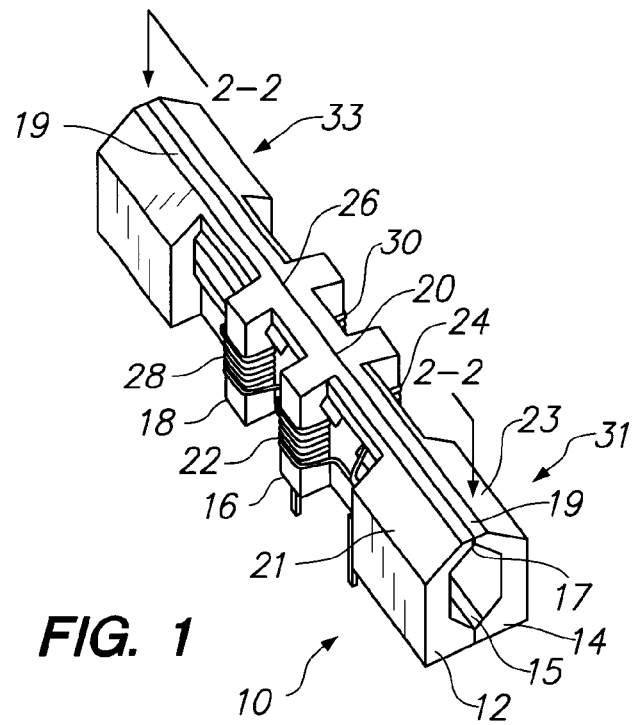
FIG. 1 is an isometric view of a dual-channel monolithic magnetic tape head assembly including a self-aligned metal film core in accordance with principles of the present invention.

With reference to the drawings, and particularly FIG. 1, a multi-channel magnetic tape head assembly 10 includes a C-bar 12 and an I-bar 14. As used herewith, the C-bar 12 is sometimes referred to as a first bar and the I-bar 14 is sometimes referred to as a second bar. While in the embodiment of FIG. 1 the C-bar 12 and the I-bar 14 have identical cross-sectional shapes, conventionally the I bar may have a flat bar shape rather than the C shape shown in the drawings hereof. By having the I bar 14 follow the cross-sectional geometry of the C-bar 12, economies are realized in the head fabrication process.

In the first preferred embodiment 10 of FIG. 1 the C-bar 12 and the I-bar 14 are formed out of a suitable substantially non-magnetic ceramic material of a type having desirable wear resistance from contact with a moving magnetic tape medium and thermal expansion compatibility with the thin magnetic metal films to be deposited in layers thereon, as hereinafter explained. Examples of suitable non-magnetic ceramics include ceramics of calcium titanate or zirconia, the latter having greater wear resistance but being somewhat harder to machine than the former.

Figure 4:
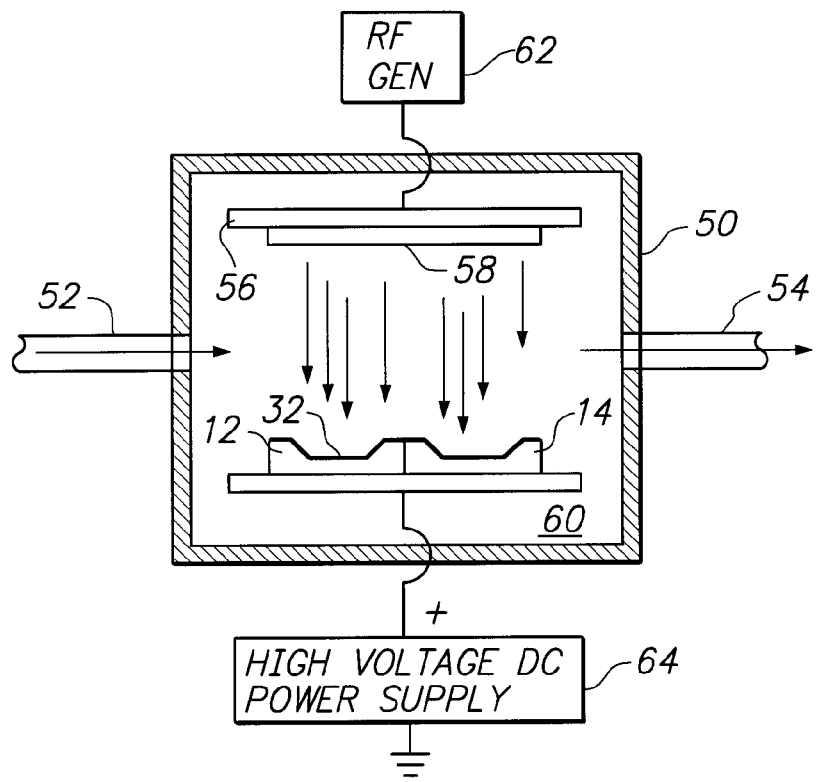
FIG. 4 is a diagrammatic view of a sputtering chamber for selectively sputtering thin-film magnetic metal alloy onto substrates of the FIG. 3 C block type.
Figure 5:
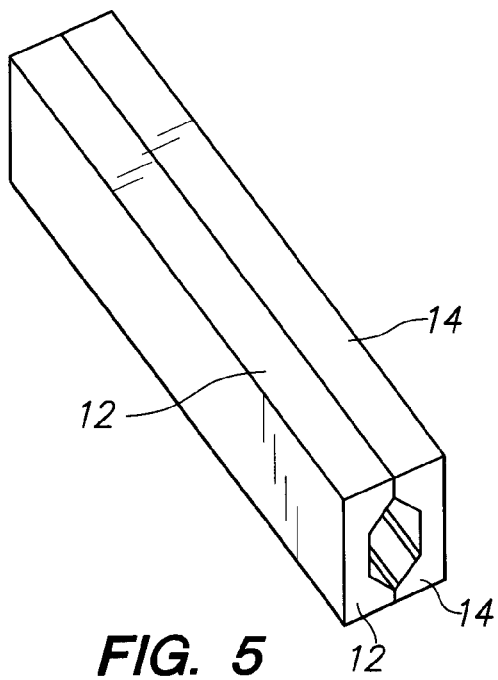
FIG. 5 is an isometric view of the FIG. 1 head assembly after selective metal film deposition and before machining into the FIG. 1 geometry.
Figure 6:
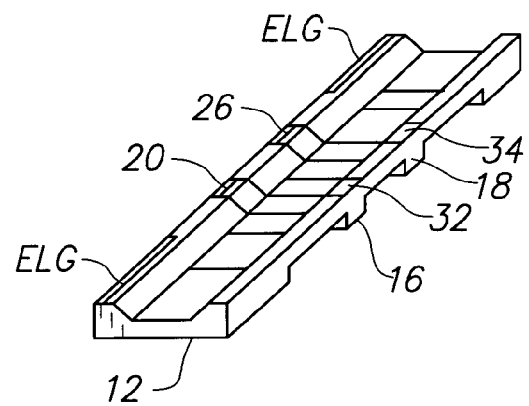
FIG. 6 is an isometric sectional view of one half of the FIG. 5 intermediate assembly following both FIG. 4 selective deposition, FIG. 5 bonding, and machining, taken along the section plane 2—2 shown in FIG. 1.

During head assembly formation, metal film laminar cores are selectively deposited at head core sites on the C-bar 12 and the I-bar 14, see FIGS. 4 and 6 discussed hereinafter. Then, the bars 12 and 14 are glass-bonded together by forming thin longitudinally extending glass bonding layers 15 and 17, FIG. 5. The resultant intermediate assembly is then machined e.g. by precision gang saws to create a plurality of spaced bar openings 250 that extend transversely through the first bar 12 and transversely through the second bar 14. The bar openings 250 define the head regions 16 and 18, FIGS. 1 and 6, and the C-bar 12 and the I-bar 14 assembly is also machined to have beveled edges 21 and 210. At the conclusion of the initial machining process the two head regions 16 and 18 are precisely defined.

The head region 16 includes a trimmed MIG head gap 20, a wire coil 22 wound around a head leg 23, of the C-bar 12, and a coil 24 wound around a head leg 25 of the I-bar 14, at the head region 16. Similarly, the head region 18 includes a trimmed MIG head gap 26, a coil 28 wound around a head leg of the C-bar, and a coil 30 wound around a head leg of the I-bar 14, at the head region 18. End regions 32 and 34 complete the FIG. 1 head assembly 10.

Figure 2:
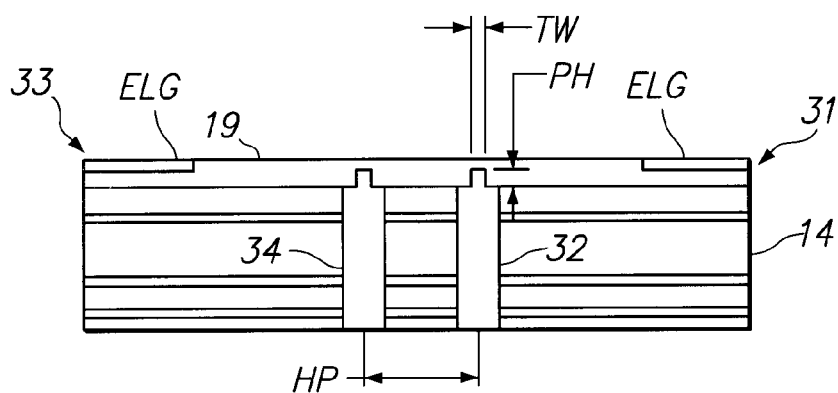
FIG. 2 is a side view in elevation and longitudinal section of the FIG. 1 tape head assembly, taken along the section plane 2—2 in FIG. 1 and illustrating selective deposition of thin-film magnetic metal alloy core film and relative alignments.

FIG. 2 provides a view of the I-bar portion of the head assembly 10 after deposition of a magnetic metal thin-film/insulation film laminar structure defining a core 32 for the head region 16 and a core 34 for the head region 18. As shown in FIG. 2 the metal film depositions are laid down in accordance with predetermined dimensions and tolerances specifying track width (TW), pole height (PH) and head pitch (HP) as shown by the dimensional arrow sets appearing in FIG. 2. In addition, metal films forming electrical lapping guides (ELG) are formed at the end regions 31 and 33. These lapping guides ELG are used during conventional lapping and polishing operations which are employed to provide a tape-contacting face 19 of the head assembly 10 with a desired final smooth contour and highly polished surface finish.

Figure 3:
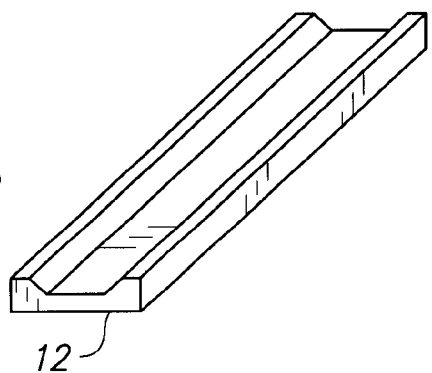
FIG. 3 is an isometric view of a C block of the FIG. 1 head assembly prior to selective metal film deposition.

FIG. 3 shows an unpatterned C-bar 12. The C-bar 12 may be provided with a masking pattern of masking material such that upon thin-film sputtering, only core regions 32 and 34 remain deposited onto the C-bar 12. Alternatively, the core regions 32 and 34 may be defined by sputtering and ion milling using conventional techniques. FIG. 4 shows the C-bar 12 and the I-bar 14 of the FIG. 1 head assembly 10 undergoing selective thin-film deposition within a deposition chamber 50. An inlet 52 and an outflow 54 enable an inert sputtering gas, such as argon, to be circulated throughout the interior of the chamber 50 by conventional circulation/filtering means (not shown). A target holder 56 holds one or more targets 58 which provide ions forming the desired magnetic metal thin-film (e.g. Fe—Si—Al Sendust) and insulating film, to enable successive layer buildup of the thin film core structures 32 and 34 shown in outline in FIG. 2. The C-bar 12 and I-bar 14 are supported on a suitable table 60 within the sputtering chamber 50. The target holder 56 and table 60 may be moved (e.g. rotated) during sputtering in order to achieve uniform thin film depositions at the desired core locations 32 and 34. Conventionally, a radio frequency generator 62 provides suitable excitation to the target holder 56, while a direct current acceleration supply 64 applies a strong positive acceleration voltage to the table 60 in order to attract ions liberated from the target 58 to the C-bar 12 and I-bar 14 as depicted by the plural arrows shown within the sputtering chamber 50.

Figure 7A:
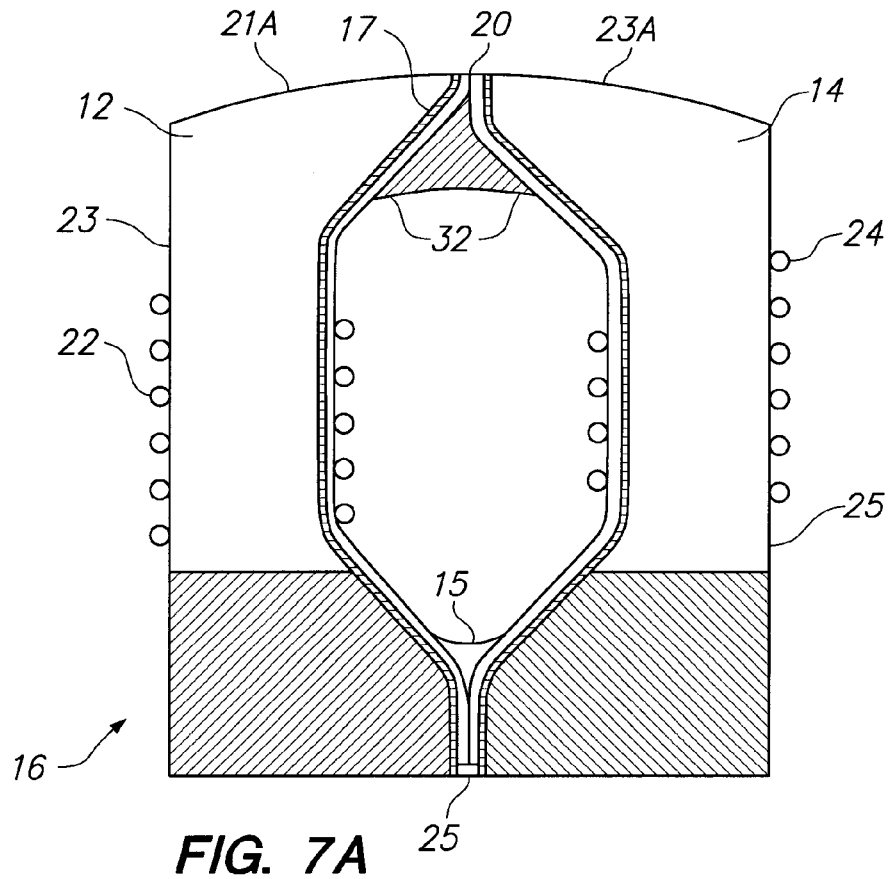
FIG. 7A is a side view in section and elevation of the FIG. 1 head assembly through one of the cores; and, FIG. 7B is an isometric view of the FIG. 7A core area with the thin magnetic metal film and insulation layers broken away to reveal the laminar construction.
Figure 7B:
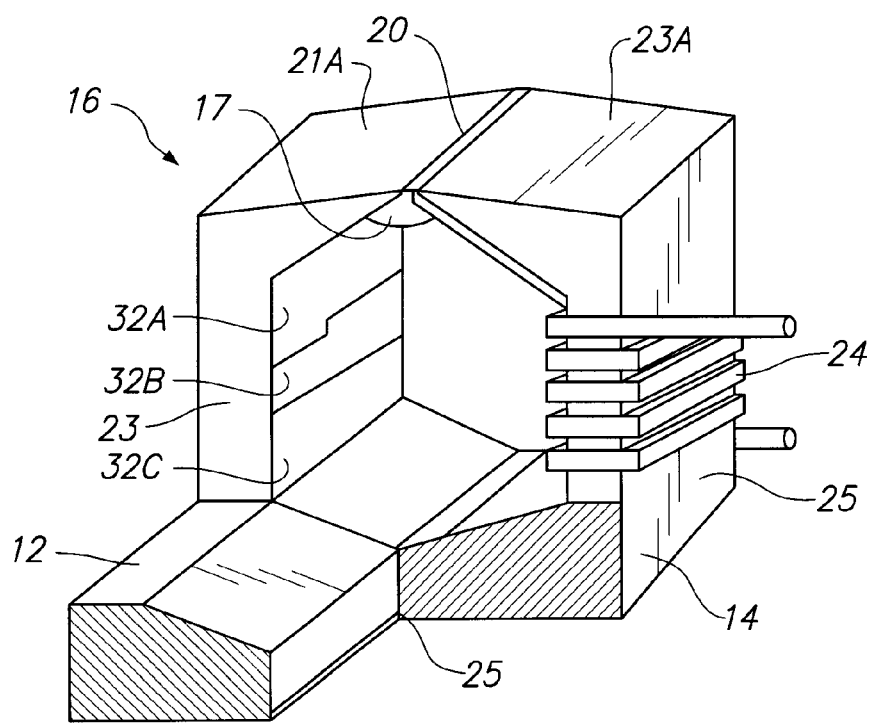
FIG. 7C is an isometric view of the FIG. 7A core area with the thin magnetic metal film and insulation layers not broken away.
Figure 7C:
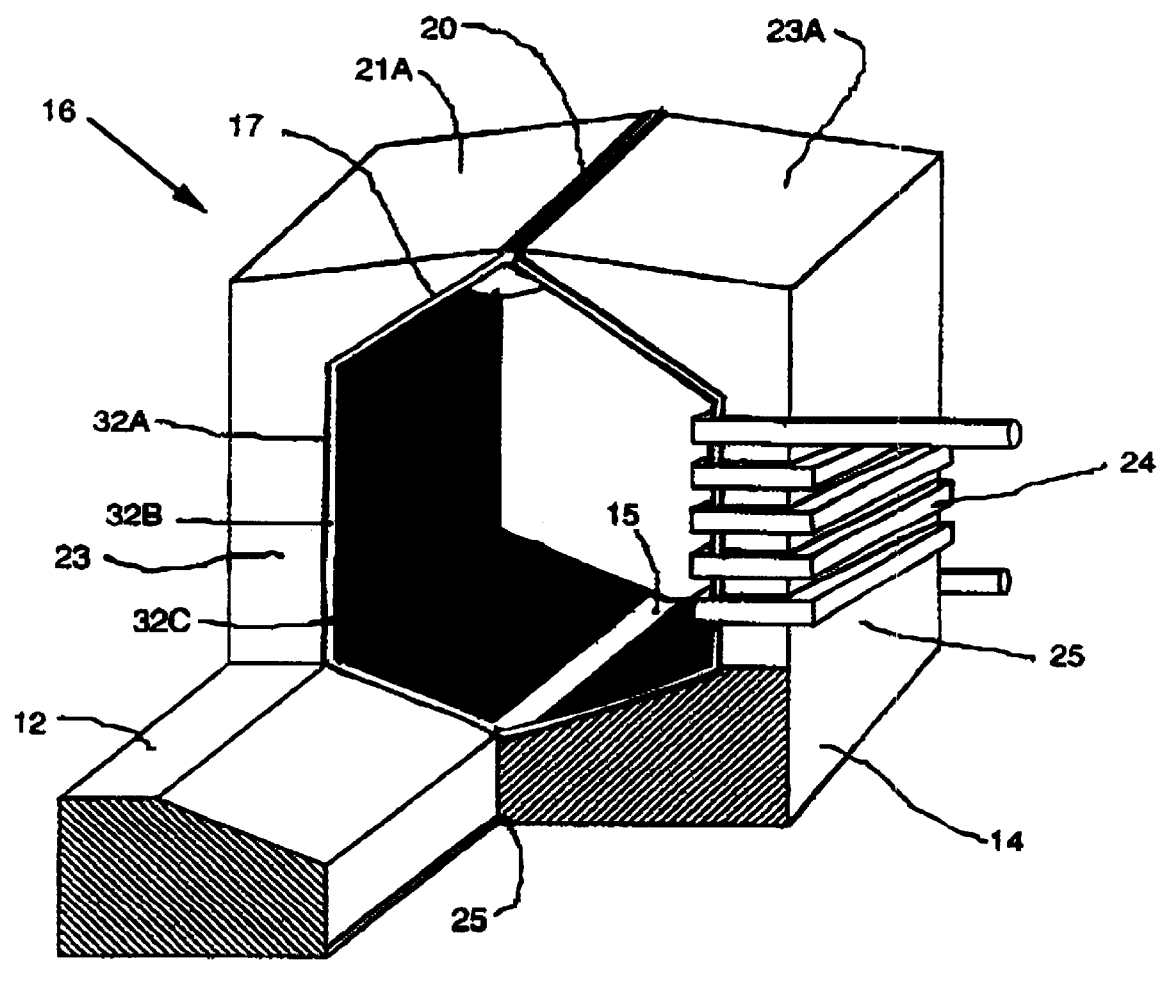

FIGS. 7A and 7B and 7C show the completed magnetic tape head at the vicinity of head region 16. The magnetic metal thin-film layers, e.g. layers 32A and 32C, form a continuous magnetic core which is interrupted only by a thin glass insulating film, e.g. glass film 32B, within the MIG head 20 (the films of C-bar 12 and I-bar 14 being connected together along a longitudinal bonding edge 25 opposite from the head gap 20. FIGS. 7A and 7C highlight that the films 32A, 32B, and 32C each encircle the longitudinal channel. Following head contouring and lapping/polishing operations, the surfaces 21A and 23A of the C-bar 12 and the I-bar 14 are prepared for direct contact with the recording surface of the magnetic tape.

Thus, those skilled in the art will now appreciate that the head assembly 10 of the present invention employs a layered core of soft magnetic thin film material such as Sendust in a self-aligned loop enabling better response to high frequency recording and playback fields. The presently described tape head structure maintains precise head alignment and pitch while simplifying otherwise time consuming and costly head manufacturing techniques of the prior art. These simplifications are realized by direct deposition of core and insulation films onto the inner surfaces of the C-bar 12 and the I-bar 14 before machining to expose core legs at head regions 16 and 18. The glass-bonded and machined assembly is then provided with windings 22, 24, 28 and 30 and encased in a tape head structure.

A sequence of process steps is followed to produce a tape head structure according to a method of the present invention.

A first step includes forming a C-bar and an I-bar of suitable ceramic material to predetermined longitudinal (cross-sectional) geometry. The cross-sectional geometry of the I-bar may be the same as, or different from, the cross-sectional geometry of the C-bar. Symmetrical cross-sections for the C-bar 12 and the I-bar 14 are shown in FIGS. 1, 4, 5 and 6.

A second step includes sequential deposition as by sputtering of thin-film magnetic metal and insulating layers onto the inner surfaces of the C-bar and I-bar at the predetermined head regions, in a manner ultimately resulting in a thin-film head core having desired magnetic permeability and minimized eddy current losses in response to a magnetic field. Alternatively, the layered core material may be generally deposited on inner surfaces of the C-bar and the I bar and then be selectively removed at the edges of the predetermined head regions by conventional ion milling techniques. Electrical lapping guide elements may also be deposited onto end regions of the C-bar and I-bar for use in final lapping/polishing operations.

A third step includes bonding the C-bar and the I-bar together, as by forming longitudinal low temperature glass bonding layers along edges of the adjacently facing C-bar and I-bar while elevated to a temperature to melt the glass but not sufficiently hot to degrade the multiple thin film laminar core structures. A thin film of insulating glass is present at the head gap locations along a longitudinal edge of the adjacently facing C-bar and I-bar at each head region.

A fourth step includes machining the bonded C-bar/I-bar assembly to expose core legs in alignment with the thin film laminar core structures thereby to define a transducer head at each head region.

A fifth step includes winding coils around at least one of the core legs of each defined head. By winding dual coils around both core legs of the head, a differential electrical signal from the head may be realized for play back with significantly improved common mode noise rejection.

A sixth step includes lapping and polishing the tape-confronting surfaces of the assembly to a desired pole height by using the electrical lapping guides as feedback controls for regulating the lapping process.

A seventh step includes encasing the completed multi-channel head assembly within a larger head mounting structure so as to be suitably sized and mounted for inclusion and electrical connection within the tape drive mechanism.

While the method and apparatus of the present invention have been summarized and explained by illustrative embodiments and applications in magnetic tape recording, it will be readily apparent to those skilled in the art that many widely varying embodiments and applications are within the teaching and scope of the present invention, and that the examples presented herein are by way of illustration only and should not be construed as limiting the scope of this invention, which is more particularly set forth in the following claims.

What is claimed is:

1. A multi-channel tape head structure comprising:

a continuous first bar and a continuous second bar that are joined together, the bars cooperating to define an inside wall surface that outlines an interior longitudinal channel;

a first head region defined in the bars between a first bar opening and a second bar opening, each bar opening extending transversely through the first bar and the second bar into the longitudinal channel, the first head region including a first magnetic gap;

a second head region defined in the bars between a third bar opening and the second bar opening, the third bar opening extending transversely through the first bar and the second bar into the longitudinal channel, the second head region including a second magnetic gap;

a first magnetic core deposited in the first head region, the first magnetic core including (i) a first metal layer that coats the inside wall surface and substantially encircles the longitudinal channel, (ii) a first insulator layer that substantially encircles the longitudinal channel and coats the first metal layer, and (iii) a second metal layer that substantially encircles the longitudinal channel and coats the first insulator layer; and a second magnetic core deposited in the second head region, the second magnetic core including (i) a first metal layer that coats the inside wall surface and substantially encircles the longitudinal channel, (ii) a first insulator layer that substantially encircles the longitudinal channel and coats the first metal layer, and (iii) a second metal layer that substantially encircles the longitudinal channel and coats the first insulator layer.

2. The multi-channel tape head structure of claim 1 wherein at least one of the bars is made of a non-magnetic ceramic material.

3. The multi-channel tape head structure of claim 1 wherein at least one of the bars is made of a magnetic ferrite ceramic material.

4. The multi-channel tape head structure of claim 1 wherein the first bar and the second bar are bonded together with at least one longitudinally extending glass bonding layer.

5. The multi-channel tape head structure of claim 1 further comprising a coil of wire, the coil of wire being wound around a portion of the first head region.

6. A multi-channel tape head structure comprising:
   a continuous first bar and a continuous second bar that are joined together, the bars cooperating to define an inside wall surface that outlines an interior longitudinal channel;
   a first head region defined in the bars between a first bar opening and a second bar opening, each bar opening extending through the first bar into the longitudinal channel;
   a second head region defined in the bars between a third bar opening and the second bar opening, the third bar opening extending through the first bar into the longitudinal channel;
   a first magnetic core deposited in the first head region, the first magnetic core including (i) a first conductive layer that coats the inside wall surface and substantially encircles the longitudinal channel, (ii) a first insulator layer that substantially encircles the longitudinal channel and coats the first conductive layer, and (iii) a second conductive layer that substantially encircles the longitudinal channel and coats the first insulator layer; and
   a second magnetic core deposited in the second head region, the second magnetic core including (i) a first conductive layer that coats the inside wall surface and substantially encircles the longitudinal channel, (ii) a first insulator layer that substantially encircles the longitudinal channel and coats the first conductive layer, and (iii) a second conductive layer that substantially encircles the longitudinal channel and coats the first insulator layer.

7. The multi-channel tape head structure of claim 6 wherein the first head region includes a first magnetic gap that extends into the longitudinal channel.

8. The multi-channel tape head structure of claim 7 wherein the second head region includes a second magnetic gap that extends into the longitudinal channel.

9. The multi-channel tape head structure of claim 8 wherein the first magnetic core extends into and coats the first magnetic gap.

10. The multi-channel tape head structure of claim 6 wherein each bar opening extends through the second bar into the longitudinal channel.

11. The multi-channel tape head structure of claim 6 including a coil of wire wound around a portion of the first head region.

12. The multi-channel tape head structure of claim 6 wherein at least one of the bars is made of a magnetic ferrite ceramic material.

13. The multi-channel tape head structure of claim 6 wherein at least one of the bars is made of a non-magnetic ceramic material.

14. The multi-channel tape head structure of claim 6 further comprising at least one longitudinal glass bonding layer that joins the first bar to the second bar.

15. The multi-channel tape head structure of claim 6 wherein each head region includes two head legs, and wherein a separate coil of wire is wound around each head leg.

* * * * *